US007822411B2

(12) United States Patent  
Nakatani (10) Patent No.: US 7,822,411 B2  
(45) Date of Patent: Oct. 26, 2010

(54) ELECTRONIC APPARATUS OPERATING SYSTEM

(75) Inventor: Atsuhito Nakatani, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 986 days.

(21) Appl. No.: 11/639,047

(22) Filed: Dec. 13, 2006

(65) Prior Publication Data

US 2007/0133843 A1      Jun. 14, 2007

(30) Foreign Application Priority Data

Dec. 13, 2005    (JP)    ............................. 2005-359472

(51) Int. Cl.  
    *H04M 3/00*    (2006.01)
(52) U.S. Cl. ...................... 455/420; 358/1.15; 370/328; 382/115
(58) Field of Classification Search ................. 235/435; 382/115; 455/41.2, 41.3, 412.1, 414.1, 415, 455/418, 419, 424, 425, 517; 370/328; 358/1.15  
See application file for complete search history.

(56) References Cited

U.S. PATENT DOCUMENTS

2003/0069921 A1*    4/2003    Lamming et al. ........... 709/203

2004/0172586 A1*    9/2004    Ragnet et al. ............... 715/500  
2005/0286463 A1*    12/2005   Matsumoto .................. 370/328  
2006/0126113 A1*    6/2006    Narazaki .................... 358/1.15

FOREIGN PATENT DOCUMENTS

JP      2003-094777      4/2003  
JP      2003-107962      4/2003  
JP      2004-297440     10/2004

* cited by examiner

*Primary Examiner*—Kent Chang  
*Assistant Examiner*—Dinh P Nguyen  
(74) *Attorney, Agent, or Firm*—Edwards Angell Palmer & Dodge LLP; David G. Conlin; David A. Tucker (57) ABSTRACT

When a user validation portion validates that a person is present adjacent to an electronic apparatus, the electronic apparatus generates an identification code, converts the identification code to a QR code, and displays the QR code on an identification code display portion. When the QR code that has been displayed has been inputted with an identification code input portion to allow an operation portion to assign operation for the electronic apparatus, an operation portion transmits operation information that indicates the operation that has been assigned and the identification code to which the QR code that has been inputted has been decoded. When the identification code that has been received by the electronic apparatus corresponds to the identification code that has been displayed thereon, the electronic apparatus executes the process according to the operation indicated by the operation information that has been received thereby.

8 Claims, 7 Drawing Sheets

ELECTRONIC APPARATUS OPERATING SYSTEM

CROSS-REFERENCE TO RELATED APPLICATION

This application claims priority to Japanese Patent Application No. JP 2005-359472, which was filed on Dec. 13, 2005, the contents of which, are incorporated herein by reference, in their entirety.

BACKGROUND OF THE INVENTION

1. Field of the Invention

The present invention relates to an electronic apparatus operating system.

2. Description of the Related Art

Conventionally, electronic apparatuses such as copying machine installed in convenience stores and the like are occasionally used by unspecified persons and the functions thereof are limited to basic ones such as a function for assigning the number of copies or a function for changing magnification, to facilitate operations so that anyone can readily operate the electronic apparatuses. On the other hand, there has been a trend to provide multi functions to copying machines for office use or household use, and accordingly customers' demand for provision of multi functions for the electronics apparatuses installed in the convenience stores and the like is enhanced, thus requiring multi-functional copying machines having simplified operability.

Japanese Unexamined Patent Publication JP-A 2003-107962 discloses an image forming apparatus operating system capable of operating with a cellular phone. The image forming apparatus operating system provides a short-distance radio transmission data communication apparatus employing a radio communication technique called Bluetooth in a copying machine and a cellular phone, respectively, to allow communication therebetween, thereby enabling the cellular phone to operate the copying machine. Even though there are differences in key arrangements and operations of operation parts of the copying machines having different types or functions, it is possible to operate the copying machine from a single operation part of the cellular phone, thus facilitating the operation of the copying machine.

Japanese Unexamined Patent Publication JP-A 2003-94777 discloses an image forming apparatus that performs user identification by a cellular phone. The image forming apparatus communicates by radio waves with a portable terminal such as a cellular phone to obtain a user name and an identification ID for user identification. This allows the user identification without forcing a user to input the user name and the identification ID every time an image is printed.

Japanese Unexamined Patent Publication JP-A 2004-297440 discloses an identification apparatus in which an imaged identification code is employed. The identification apparatus transmits the identification code such as a bar code that has been imaged by a digital camera or the like, to an identification code decoder, and determines whether registration of the identification code that has been transmitted exists or not. This enables the user identification without using an expensive bar code reader, whereby allowing identification using the identification code even at stores having a small number of customers, or the like.

Technique disclosed in JP-A 2003-107962 is aimed at operating an image forming apparatus using a cellular phone to facilitate operation of the image forming apparatus. However, in order to allow the communication between the image forming apparatus and the cellular phone, there is a problem that a short-distance radio transmission data communication apparatus employing a radio communication technique such as Bluetooth needs to be provided in the image forming apparatus and the cellular phone, respectively. Moreover, unfortunately, the image forming apparatus can be operated not only by a person adjacent to the image forming apparatus, but also by a person in an area where it is possible to communicate therewith by using a short-distance radio transmission data communication apparatus. This can cause a problem that the use of the image forming apparatus by the person in the area may disturb the use of the image forming apparatus by the person adjacent thereto.

Technique disclosed in JP-A 2003-94777 is aimed at obtaining a user name and an identification ID from a portable terminal to perform user identification. But disadvantageously the user name and the identification code need to be previously registered in the image forming apparatus and the portable terminal. Similarly, technique disclosed in JP-A 2004-297440 is aimed at performing identification by an identification code such as a bar code that has been imaged by a digital camera or the like. But unfortunately an identification code needs to be previously registered in an identification apparatus.

SUMMARY OF THE INVENTION

An object of the invention is to provide an electronic apparatus operating system that allows only a person adjacent to an electronic apparatus to readily operate the electronic apparatus without the need for registering an identification code or the like for identifying a user, and without using a short-distance radio transmission data communication apparatus employing a radio communication technique such as Bluetooth.

The invention provides an electronic apparatus operating system comprising:

an electronic apparatus including a generating portion for generating identification information which identifies the electronic apparatus and an output portion for outputting the identification information that has been generated by the generating portion;

an operation apparatus including an input portion for inputting the identification information that has been outputted by the output portion of the electronic apparatus, an operation portion for inputting operation information for operating the electronic apparatus, and a transmission portion for transmitting the identification information that has been inputted by the input portion and the operation information that has been inputted by the operation portion; and a transfer portion for transferring the identification information and operation information that has been transmitted by the transmission portion of the operation apparatus to the electronic apparatus identified by the identification information;

wherein the electronic apparatus further comprises a reception portion for receiving the identification information and operation information transmitted from the transfer portion, and executes the process according to the operation indicated by the operation information that has been received by the reception portion.

According to the invention, in the electronic apparatus, the identification information for identifying the electronic apparatus is generated by the generating portion, and the identification information that has been generated by the generating portion is outputted by the output portion. In the operation apparatus, the identification information that has been outputted by the output portion of the electronic apparatus is inputted by the input portion, the operation information for operating the electronic apparatus is inputted by the operation portion, and the identification information that has been inputted by the input portion and the operation information that has been inputted by the operation portion is transmitted by the transmission portion. In the transfer portion, the identification information and the operation information each that has been transmitted by the transmission portion of the operation apparatus is transferred to the electronic apparatus identified by the identification information. Moreover, in the electronic apparatus, the identification information and the operation information each that has been transmitted from the transfer portion is received by the reception portion, and the process according to the operation indicated by the operation information that has been received by the reception portion is executed.

As described above, when a user adjacent to the electronic apparatus inputs the identification information that has been generated and outputted in the electronic apparatus into the operation apparatus, and the operation apparatus transmits the identification information with the operation information added thereto, and the transfer portion such as a cellular phone base station apparatus transfers the identification information and the operation information to the electronic apparatus identified by the operation information, the electronic apparatus executes the process according to the operation indicated by the operation information. This eliminates the need for previously registering the identification code or the like for identifying a user, and allows only a user adjacent to the electronic apparatus to readily operate the electronic apparatus from the operation apparatus such as a portable terminal without using a short-distance radio transmission data communication apparatus employing a radio communication technique such as Bluetooth.

In accordance with the invention, the electronic apparatus operating system eliminates the need for previously registering the identification code or the like for identifying a user, and allows only a user adjacent to the electronic apparatus to readily operate the electronic apparatus from the operation apparatus such as a portable terminal without using a short-distance radio transmission data communication apparatus employing a radio communication technique such as Bluetooth. This allows only a user adjacent to the electronic apparatus to readily operate the electronic apparatus by using the user's favorite portable apparatus, reduces the possibility that another person sees the operation screen, and enables the operation without touching a common operation panel.

In the invention, it is preferable that when the identification information that has been received by the reception portion corresponds to the identification information that has been generated by the generating portion, the electronic apparatus executes the process according to the operation indicated by the operation information that has been received by the reception portion.

According to the invention, when the identification information that has been received by the reception portion corresponds to the identification information that has been outputted by the output portion, the electronic apparatus executes the process according to the operation indicated by the operation information that has been received by the reception portion. This allows a user to operate the electronic apparatus only from the operation apparatus to which the user has been able to input the identification information that has been outputted by the output portion.

In accordance with the invention, the electronic apparatus can be operated only from the operation apparatus to which the user has been able to input the identification information that has been outputted by the output portion. This allows only a user adjacent to the electronic apparatus to operate the electronic apparatus.

In the invention, it is preferable that the electronic apparatus further comprises:

a user validation portion for validating that a user is present adjacent to the electronic apparatus in the predetermined area centered on the electronic apparatus; and a control portion for causing the generating portion to generate the identification information and then causing the output portion to output the identification information that has been generated by the generating portion, when the user validation portion validates that a user is present in the predetermined area centered on the electronic apparatus.

According to the invention, the electronic apparatus can generate the identification information and output through the output portion, when the user validation portion of the electronic apparatus validates that a user is present in the predetermined area centered on the electronic apparatus.

In accordance with the invention, when determining that a user is present in the predetermined area centered on the electronic apparatus, the electric apparatus can generate the identification information to limit a user who can operate the electronic apparatus to a user who is present in the predetermined area centered on the electronic apparatus.

In the invention, it is preferable that after the process according to the operation indicated by the operation information that has been received from the transfer portion is finished, or when the user validation portion does not validate that a user is present in the predetermined area centered on the electronic apparatus, the control portion causes the identification information that has been outputted through the output portion to be erased, and when the user validation portion newly validates that a user is present in the predetermined area centered on the electronic apparatus, the control portion causes identification information to be newly generated and causes the output portion to output the identification information that has been newly generated.

According to the invention, the control portion causes the identification information that has been outputted through the output portion to be erased, after the process according to the operation indicated by the operation information is finished, or when the user validation portion does not validate that a user is present in the predetermined area centered on the electronic apparatus. Furthermore, when the user validation portion newly validates that a user is present in the predetermined area centered on the electronic apparatus, the control portion causes the generating portion to newly generate identification information and causes the output portion to output the identification information that has been newly generated. Accordingly, the identification information can be newly generated with respect to each processing unit or user.

In accordance with the invention, the identification information can be newly generated with respect to each processing unit or user. This can prevent another user from operating the electronic apparatus using the identification information that was previously used.

In the invention, it is preferable that the output portion of the electronic apparatus is a display panel, and the input portion of the operation apparatus is an imaging portion that images the identification code that has been displayed on the display panel.

In accordance with the invention, the output panel of the electronic apparatus is the display panel, and the input portion of the operation apparatus is the imaging portion such as a camera, so that the apparatus can be operated from the operation apparatus having the imaging portion.

In accordance with the invention, the electronic apparatus can be operated from the operation apparatus having the imaging portion, so that the electronic apparatus can be operated by the portable terminal such as a cellular phone having a camera.

In the invention, it is preferable that the operation apparatus further includes a storage portion for storing the operation information that has been inputted by the operation portion, and the transmission portion transmits the operation information that has been selected by the operation portion out of the identification information that has been inputted by the input portion and the operation information that has been stored in the storage portion.

In accordance with the invention, the operation information can be selected from the operation information that has been inputted by the operation portion and stored in the storage portion, so that the operation information that has been previously registered can be utilized.

According to the invention, the operation information that has been previously registered can be utilized. This can simplify the operation for inputting the operation information. For example, the operation for inputting the operation information includes only one action for selecting the operation from the list of the operation information that has been stored in the storage portion, and requires no need for sequentially operating to achieve a screen for selecting the operation from the main menu of the operation apparatus. In addition, a user simply selects the operation from the operation information that has been stored in the storage portion, even though the electronic apparatus is a different apparatus. Moreover, the operation for inputting a final destination address of a screen can be simplified by including a mail address stored in the operation apparatus such as a portable terminal into the operation information for operating to send an e-mail.

Moreover, in the invention, it is preferable that the operation apparatus further includes a storage portion for storing the identification information and the operation information each that has been transmitted by the transmission portion, and an extracting portion for extracting the operation information from the identification information and the operation information each that has been stored in the storage portion, and the transmission portion transmits the operation information that has been selected by the operation portion and the identification information that has been inputted by the input portion out of the operation information that has been extracted by the extracting portion.

According to the invention, the operation portion transmits the operation information that has been extracted by the extracting portion and the identification information that has been inputted by the input portion, from the storage portion that stores the identification information and the operation information each that has been transmitted by the transmission portion. Therefore, the operation apparatus can transmit the operation information of the operation that was previously executed, in corporation with the identification information that has been outputted from the electronic apparatus adjacent to a user.

In accordance with the invention, the operation apparatus can transmit the operation information of the operation that was previously executed, in corporation with the identification information that has been outputted from the electronic apparatus adjacent to a user. Consequently, the user can execute the operation, which the user previously executed for the electronic apparatus including other electronic apparatuses, for the electronic apparatus adjacent to the user, and can utilize the operation information previously stored like a book mark, that is, the command for the electronic apparatus, also for other electronic apparatuses.

In the invention, it is preferable that the electronic apparatus further includes a WEB server function, the operation apparatus further includes a WEB browser function, the identification information includes a URL (Uniform Resource Locator) of the WEB server function of the electronic apparatus, and the WEB browser function accesses the WEB server function by assigning the URL.

According to the invention, the electronic apparatus includes the WEB server function, and the WEB browser function assigns the URL included in the identification information to access the WEB server function, so that the electronic apparatus can be operated from the screen of the WEB browser displayed on the operation apparatus.

In accordance with the invention, the electronic apparatus can be operated from the screen of the WEB browser displayed in the operation apparatus. Therefore, the electronic apparatus can be operated from the consistent screen of the WEB browser, allowing the operation to have common operation specifications, even though the operation specification varies depending upon the size of display panels of the common manufacturer's apparatuses.

BRIEF DESCRIPTION OF THE DRAWINGS

Other and further objects, features, and advantages of the invention will be more explicit from the following detailed description taken with reference to the drawings wherein.

DETAILED DESCRIPTION

Now referring to the drawings, preferred embodiments of the invention are described below.

Figure 1:
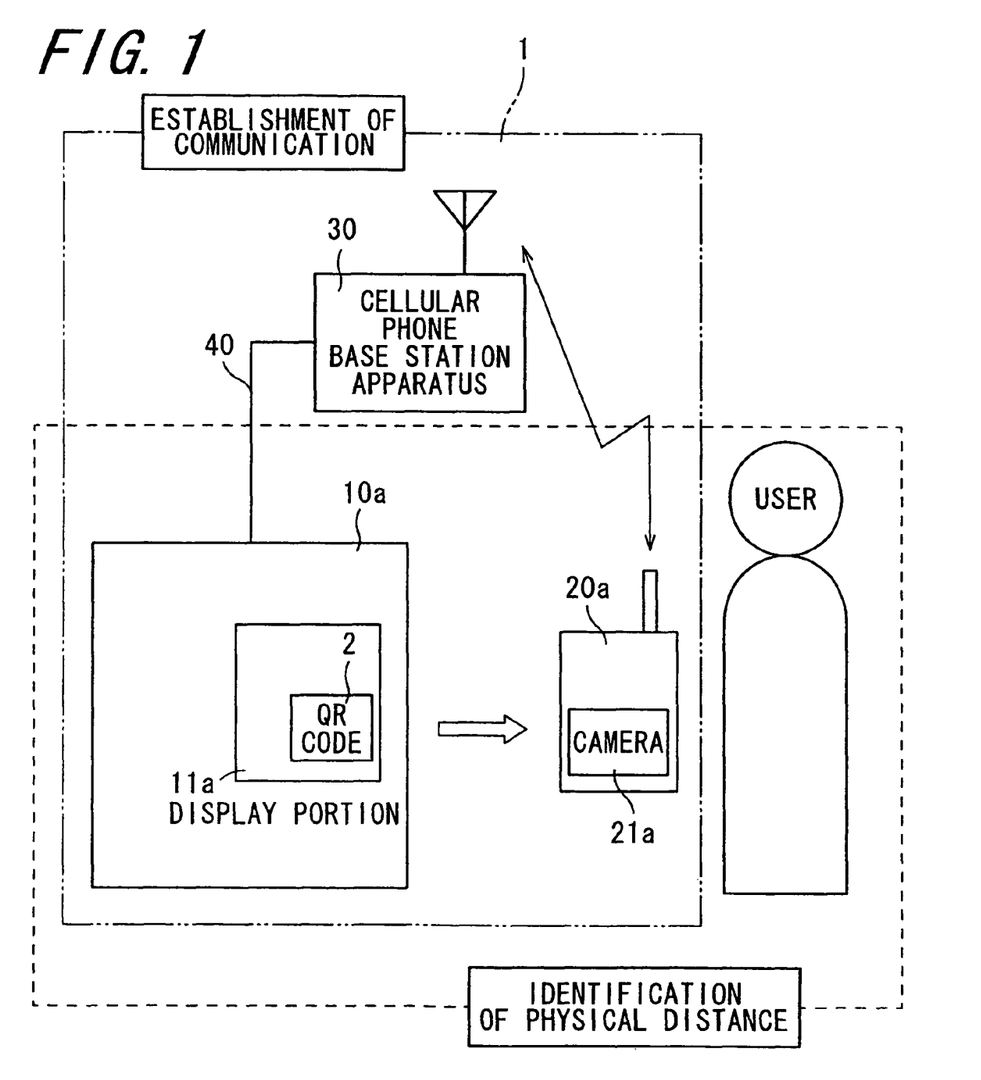
FIG. 1 is a schematic diagram illustrating one configuration example of an electronic apparatus operating system according to one embodiment of the invention.

FIG. 1 is a schematic diagram illustrating one configuration example of an electronic apparatus operating system according to one embodiment of the invention. The electronic apparatus operating system 1 includes an electronic apparatus such as an MFP (Multi Functional Peripheral) 10a, an operation apparatus such as a cellular phone 20a, a cellular phone base station apparatus 30, and a communication link 40.

The MFP 10a is a complex apparatus including a display portion 11a configured with a liquid crystal touch panel and the like and has a WEB server function. The MFP 10a is connected to the cellular phone base station apparatus 30 via the communication link 40 such as the internet. The cellular phone 20a is for example a cellular phone set, can communicate by radio waves with the MFP 10a via the cellular phone base station apparatus 30, and has a WEB browser function. That is, the communication between the MFP 10a and the cellular phone 20a can be established via the cellular phone base station apparatus 30.

The MFP 10a converts an identification code for identifying the differences between the MFP 10a and a user adjacent to the MFP 10a into for example a QR (Quick Response) code 2 as a two-dimensional code to display the QR code 2 on the display 11a. The cellular phone 20a includes a camera 21a for taking an image, by which an image of the QR code 2 that has been displayed on the display portion 11a is taken.

The identification code includes a URL (Uniform Resource Locator) of the MFP 10a as a server, and the cellular phone 20a allows the WEB browser to assign the URL contained in the identification code to access the server identified by the URL. The MFP 10a is a server which is identified by the URL contained in the QR code 2 displayed on the display portion 11a, and the cellular phone 20a can access the MFP 10a by the URL. That is, the cellular phone 20a that accesses the MFP 10a corresponds to the cellular phone that accesses the MFP 10a by using the URL contained in the QR code 2 displayed on the display 11a.

Accordingly, the MFP 10a can recognize that a user whose cellular phone 20a accesses the MFP 10a corresponds to a user who is present adjacent to the MFP 10a and has been able to image the QR code 2 displayed on the display portion 11 of the MFP 10a with the camera 21a of the cellular phone 20a. That is, the physical distance between the MFP 10a and the user can be identified.

Figure 2:
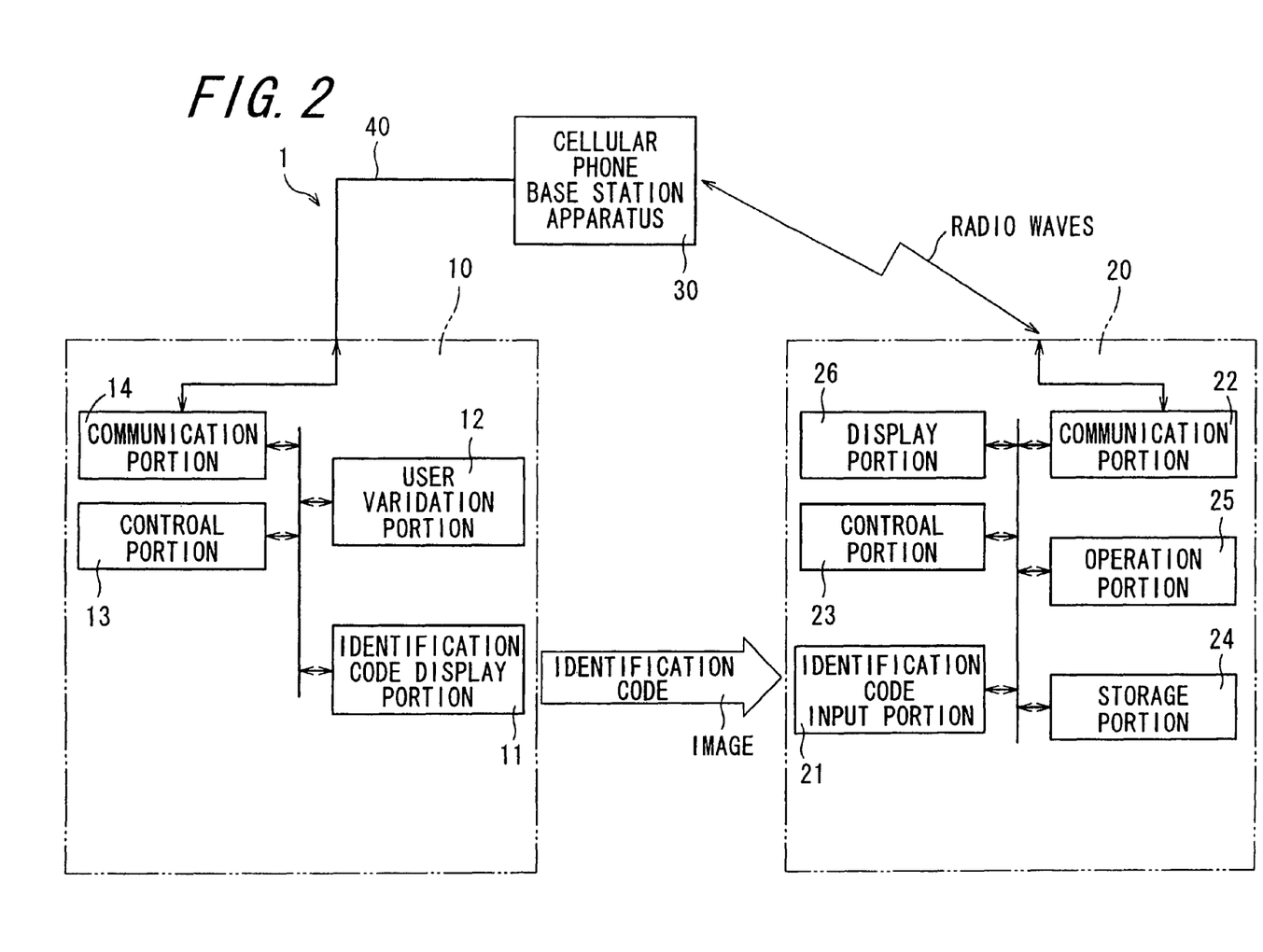
FIG. 2 is a block diagram illustrating the electronic apparatus operating system according to one embodiment of the invention.

FIG. 2 is a block diagram illustrating the electronic apparatus operating system according to one embodiment of the invention. The electronic apparatus operating system 1 includes an electronic apparatus 10, an operation apparatus 20, the cellular phone base station apparatus 30, and the communication link 40.

The electronic apparatus 10 is an electronic apparatus such as a copying machine, a scanner, a printer, a facsimile, or an MFP in a complex form of them, and includes an identification code display portion 11, a user validation portion 12, a control portion 13, and a communication portion 14. The identification code display portion 11 corresponds to the display portion shown in FIG. 1 and is configured with for example a liquid crystal touch panel.

The identification code display portion 11 displays the information that has been received from the control portion 13, for example, the identification code such as the QR code 2. The user validation portion 12 is configured with for example a pyroelectric infrared sensor which detects infrared rays emitted from a human body, and validates that a person is present adjacent to the electronic apparatus 10, for example within the reach of the person, and then transmits the validation result to the control portion 13.

The control portion 13 is configured with for example a CPU (Central Processing Unit) and a storage device such as a semiconductor memory, and causes the CPU to execute a program stored in the storage device to control the identification code display portion 11, the user validation portion 12, and the communication portion 14. When the electronic apparatus 10 is for example the MFP, the control portion 13 controls the process which is operated from the liquid crystal, for example making a copy, printing out, scanning, sending a facsimile or sending an e-mail. The control portion 13 further includes the WEB server function and causes the CPU to execute a program stored in the storage device to achieve the WEB server function. The communication portion 14 is a communication apparatus for communicating with the cellular phone base station apparatus 30 via the communication link 40, for example a network such as the internet.

The operation apparatus 20 is a handheld portable terminal such as a cellular phone, or a PDA (Personal Digital Assistant), and includes an identification code input portion 21, a communication portion 22, a control portion 23, a storage portion 24, an operation portion 25, and a display portion 26.

The identification code input portion 21 is an input apparatus for inputting the information that has been displayed on the identification code display portion 11 of the electronic apparatus 10, is configured with a photographic apparatus such as a camera, and transmits the information that has been inputted, for example the identification code such as the QR code 2, to the control portion 23. The communication portion 22 is a communication apparatus for communicating by radio waves with the cellular phone base station apparatus 30, transmits the information that has been received from the control portion 23 by radio waves to the cellular phone base station apparatus 30, and transmits the information that has received from the cellular phone base station apparatus 30 to the control portion 23.

The control portion 23 is configured with a CPU and a storage device such as a semiconductor memory, and causes the CPU to execute a program stored in the storage device to control the identification code input portion 21, the communication portion 22, the storage portion 24, the operation portion 25, and the display portion 26. The control portion 23 includes the WEB browser function and causes the CPU to execute a program stored in the storage device to achieve the WEB browser function.

The storage portion 24 is configured with a storage device such as a semiconductor memory or a hard disk device, and stores the information that has been received from the control portion 23. The operation portion 25 is an input apparatus having a key for inputting information and an operation key for operating the operation apparatus 20, and transmits the information that has been inputted to the control portion 23. The display portion 26 is configured with a display apparatus such as a liquid crystal panel, and displays the information that has been received from the control portion 23.

The cellular phone base station apparatus 30 is a telephone exchange having for example a DNS (Domain Name Server) function, and allows the communication between the electronic apparatus 10 as a server, which is identified by the URL assigned by the WEB browser function of the operation apparatus 20, and the operation apparatus 20.

The control portion 13 of the electronic apparatus 10 generates the identification code, converts the identification code to the QR code 2, and transmits the QR code 2 that has been converted, to the identification code display portion 11 to display the QR code 2, when informed from the user validation portion 12 that a person is present adjacent to the electronic apparatus 10.

The identification code, which is the information for identifying the differences between the electronic apparatus 10 and a user adjacent to the electronic apparatus 10, includes a header and a specific information portion. The header is the information for identifying for example manufacturers of electronic apparatuses. The specific information portion includes for example a model name/serial number and a one-time password. The header and the model name/serial number are electronic apparatus identification information for identifying the electronic apparatus. The one-time password is user identification information for identifying a user who is present adjacent to the electronic apparatus. The one-time password is for example a random number updated when the identification code is generated, or unique information such as the information indicating a date and a time.

When a user inputs the QR code 2 that has been displayed on the identification code display portion 11 of the electronic apparatus 10 through the identification code input portion 21, the identification code input portion 21 transmits the QR code 2 that has been inputted to the control portion 23. The control portion 23 decodes the QR code 2 that has been received to the identification code and then transmits the identification code as the URL through the communication portion 22.

When the WEB page information is transmitted from the server identified by the URL that has been transmitted, that is, the electronic apparatus 10, the WEB browser function is activated to display a WEB screen page on the display portion 26. A user assigns the operation for the electronic apparatus 10 from a menu of the WEB screen page that has been displayed on the display portion 26. The control portion 23 adds the operation information indicating the operation that has been assigned by the operation portion 25 to the identification code to generate a link URL.

Figure 3:
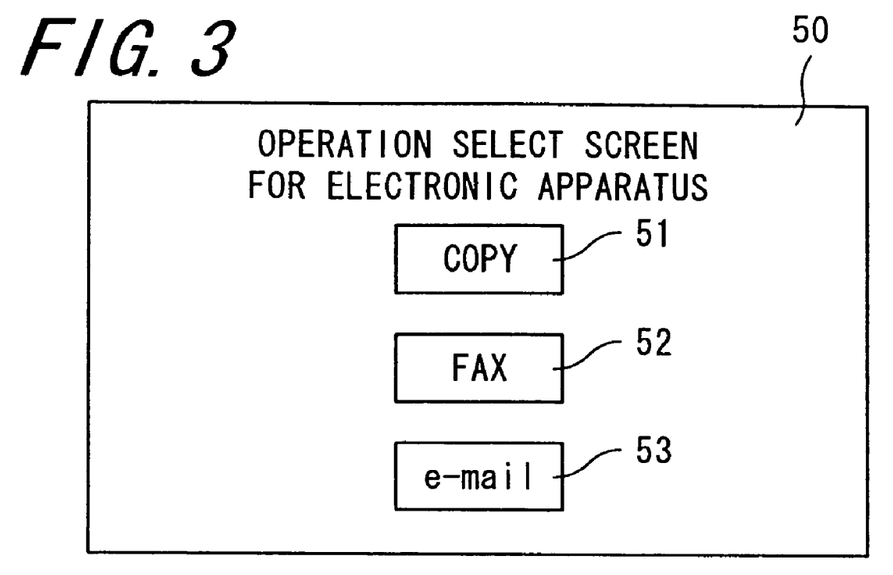
FIG. 3 shows one example of an operation select screen for the electronic apparatus which is displayed in a display portion of an operation apparatus of FIG. 2.

FIG. 3 shows one example of an operation select screen for the electronic apparatus 50 which is displayed in a display portion 26 of an operation apparatus 20 of FIG. 2. The operation select screen for the electronic apparatus 50 is a WEB screen page that has been transmitted from the WEB server function of the electronic apparatus 10.

In the operation select screen for the electronic apparatus 50, three operation buttons, that is, a copy button 51, a fax button 52, and an e-mail button 53 are displayed below the headline entitled OPERATION SELECT SCREEN FOR ELECTRONIC APPARATUS. The copy button 51 is an operation button for instructing the electronic apparatus 10 to copy. The fax button 52 is an operation button for instructing the electronic apparatus 10 to send a facsimile. The e-mail button 53 is an operation button for instructing the electronic apparatus 10 to send an e-mail. When the desired operation button is selected from these buttons, the link URL corresponding to the selected button is generated.

FIG. 3 shows a state in which the e-mail button 53 surrounded with a bold frame is selected. An operation key of the operation portion 25 is operated to select another operation button. For example, the key for moving the selected item is pressed to move the operation button surrounded with a bold frame, and then the key such as a decision key is pressed to select another operation button. When any operation button is not selected in the operation select screen for the electronic apparatus 50, for example a cancel key of the operation portion 25 or the like can be pressed to skip the selection.

Figure 4A:
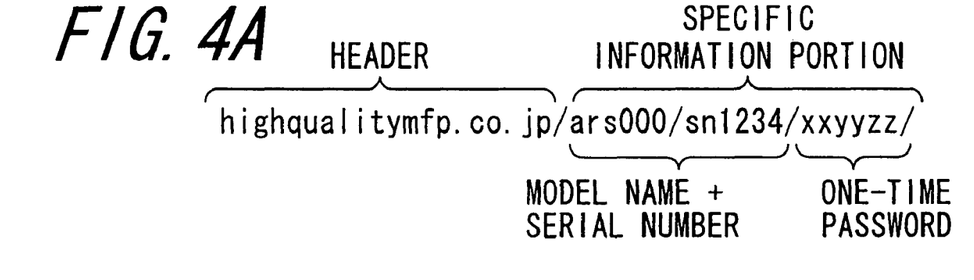
FIG. 4A shows one example of an identification code which is used in the electronic apparatus operating system of FIG. 2.
Figure 4B:
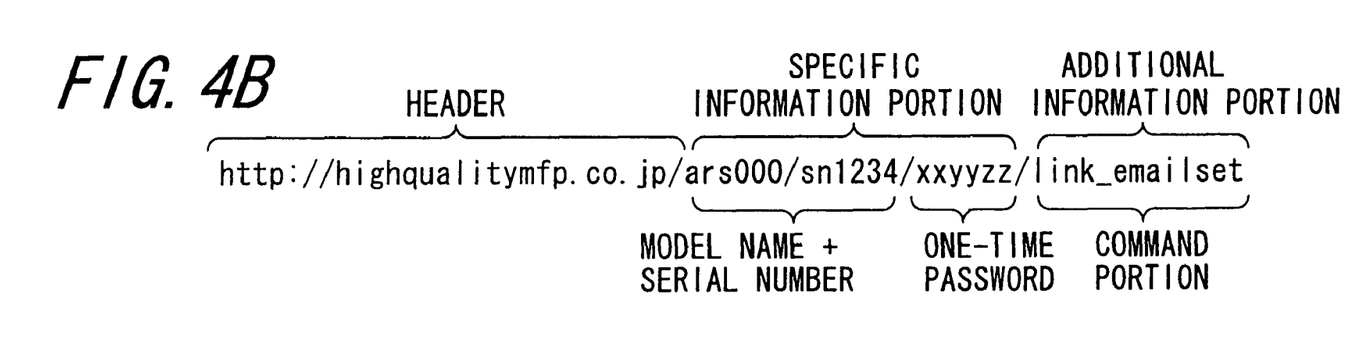
FIG. 4B shows one example of a link URL which is used in the electronic apparatus operating system of FIG. 2.

FIGS. 4A and 4B show one example of an identification code and a link URL which are used in the electronic apparatus operating system 1 of FIG. 2. FIG. 4A shows one example of the identification code of the QR code 2 displayed on the identification code display portion 11. The header, that is, the information identifying a manufacturer of the electronic apparatus is "highqualitymfp.co.jp". The model name/serial number of the electronic apparatus included in the specific information portion is "ars000/sn1234". The one-time password included in the specific information portion, that is, the user identification information is "xxyyzz". The electronic apparatus identification information is "highqualitymfp.co.jp/ars000/sn1234".

FIG. 4B shows the link URL which is generated in the operation apparatus 20 based on the identification code of FIG. 4A. The link URL includes "http://" indicating a description according to the HTTP protocol, followed by "highqualitymfp.co.jp/ars000/sn1234/xxyyzz/" as the identification code information of FIG. 4A, and followed by "link_emailset" as additional information indicating the operation assigned by the operation portion 25, that is, a command portion. The information indicated in the command portion is the operation information, and the command portion, "link_emailset" is the operation information indicating the operation for assigning the sending of an e-mail.

When a user assigns an operation from the operations that have been displayed in the WEB screen page of the display portion 26, the control portion 23 generates and transmits the link URL to access the server identified by the link URL. That is, when the control portion 23 causes the communication portion 22 to transmit the link URL to the cellular phone base station apparatus 30, the cellular phone base station apparatus 30 transmits the link URL that has been received to the electronic apparatus 10 identified by the electronic apparatus identification information included in the link URL.

When the communication portion 14 of the electronic apparatus 10 receives the URL from the cellular phone base station apparatus 30, the communication portion 14 transmits the link URL that has been received to the control portion 13. The control portion 13 executes the process according to the operation indicated by the operation information included in the link URL, when the identification information included in the link URL that has been received corresponds to the identification code indicated by the QR code 2 that has been generated by the control portion 13 and displayed on the identification code display portion 11.

The control portion 13 causes the QR code 2 or the identification code that has been displayed on the identification code display portion 11 to be erased, when the process is finished or when the user validation portion 12 fails to validate that a person is present adjacent to the electronic apparatus 10. When the user validation portion 12 newly validate that a person is present adjacent to the electronic apparatus, the control portion 13 causes a new identification code to be generated, and converted to a QR code 2, and which is displayed on the identification code display portion 11.

The generating portion is for example the control portion 13, the output portion is for example the identification code display portion 11, the operation portion is for example the operation portion 25, the transmission portion is for example the communication portion 22, the transfer portion is for example the cellular phone base station apparatus 30 and the communication link 40, the reception portion is for example the communication portion 14, the user validation portion is for example the user validation portion 12, the control portion is for example the control portion 13, the imaging portion is for example the camera 21, the storage portion is for example the storage portion 24, and the extracting portion is for example the control portion 23.

Figure 5:
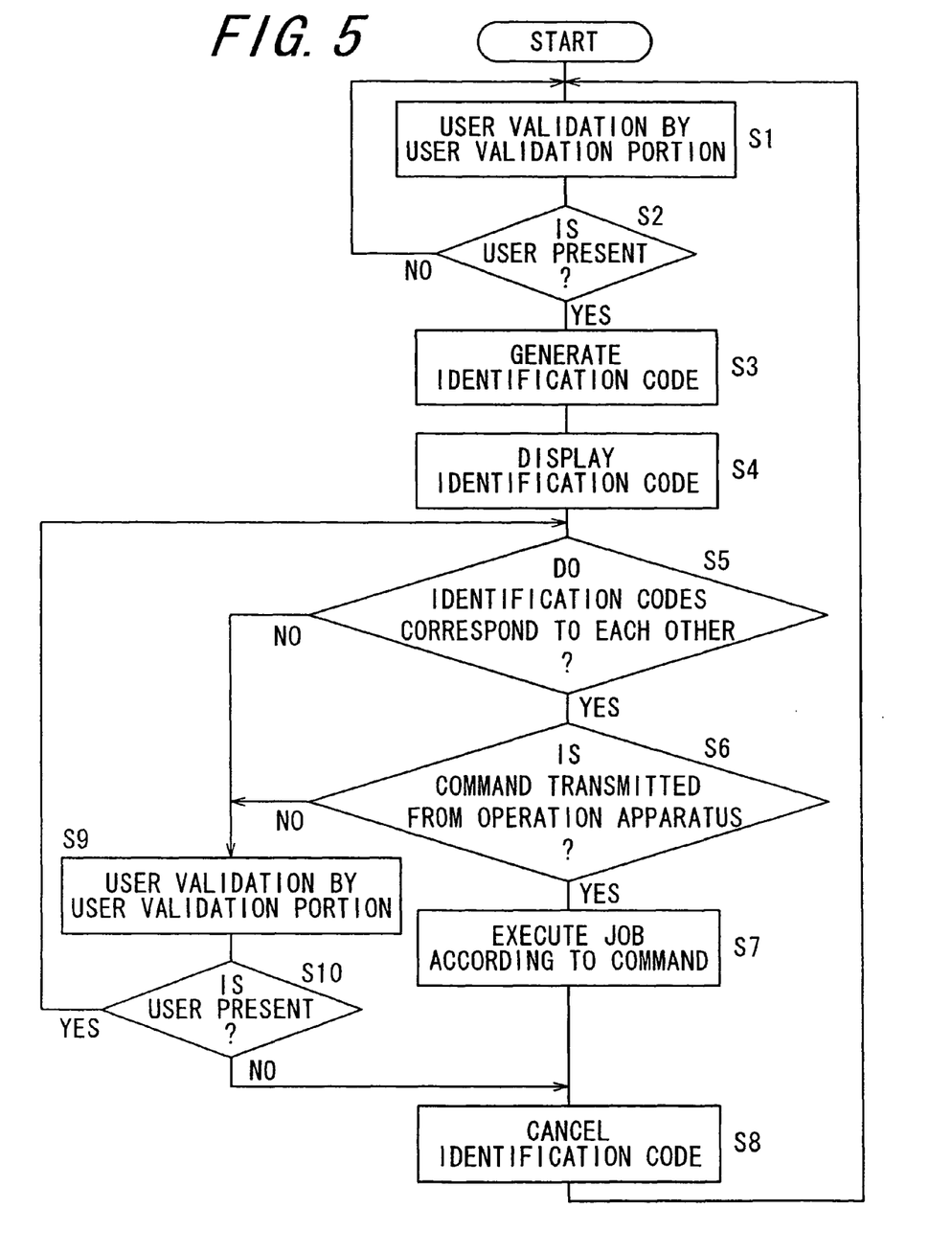
FIG. 5 is a flowchart of a process which is executed by the electronic apparatus of FIG. 2.

FIG. 5 is a flowchart of a process which is executed by the electronic apparatus 10 of FIG. 2. The flowchart is executed by the control portion 13 of the electronic apparatus 10. When the power supply of the electronic apparatus 10 is provided to enter the operable state, the process proceeds to Step S1.

At Step S1, user validation by the user validation portion 12 is performed. That is, whether the user is present adjacent to the electronic apparatus 10 or not is validated. At Step S2, it is determined whether the user is present adjacent thereto or not in accordance with the validation result of the user validation portion 12. When the validation result of the user validation portion 12 shows that the user is present adjacent thereto, the process proceeds to Step S3, and when the validation result of the user validation portion 12 does not show that the user is present adjacent thereto, the process returns to Step S1.

At Step S3, the identification code is generated. For example, the identification code of FIG. 4A is generated. At Step S4, the identification code that has been generated at Step S3 is converted to the QR code 2, which is displayed on the identification code display portion 11.

At Step S5, whether the identification codes correspond to each other or not is determined. That is, it is determined whether or not the identification code included in the link URL that has been received by the communication portion 14 corresponds to the QR code 2 or the identification code that has been displayed on the identification code display portion 11 at Step S4. When both identification codes correspond to each other, the WEB screen page is transmitted to the operation apparatus 20 and the process proceeds to Step S6, and when both identification codes do not correspond to each other, the process proceeds to Step S9.

In the case as described above, whether the identification codes correspond to each other with respect to the whole part thereof or not is determined, but it may be determined whether only the user identification information included in the identification code, that is, only the one-time passwords correspond to each other or not. This is because the cellular phone base station apparatus 30 transmits the identification code to the electronic apparatus 10 identified by the identification code excluding the user identification information, and the identification code included in the link URL that has been received by the communication portion 14 corresponds to the identification code which the electronic apparatus 10 originally generates, excluding the user identification information.

At Step 6, whether a command from the operation apparatus 20 is present or not is determined. That is, whether the link URL that has been received includes the operation information or not is determined. When the command is included, the process proceeds to Step S7, and when the command is not included, the process proceeds to S9. At Step S7, a job corresponding to the command is executed. That is, the process is executed according to the operation indicated by the operation information included in the link URL that has been received. At Step 8, the QR code 2 or the identification code that has been displayed on the identification code display portion 11 is canceled and the process is finished. That is, when the process according to the operation indicated by the operation information is completed, the identification code displayed on the identification code display portion 11 is erased and the process is finished.

At Step S9, user validation by the user validation portion 12 is performed. That is, whether the user is present adjacent to the electronic apparatus 10 or not is validated. At Step S10, it is determined whether the user is present adjacent thereto in accordance with the validation result of the user validation portion 12. When the validation result shows that the user is present adjacent thereto, the process returns to Step S5, and when the validation result does not show that the user is present adjacent thereto, the process proceeds to Step S8.

Figure 6:
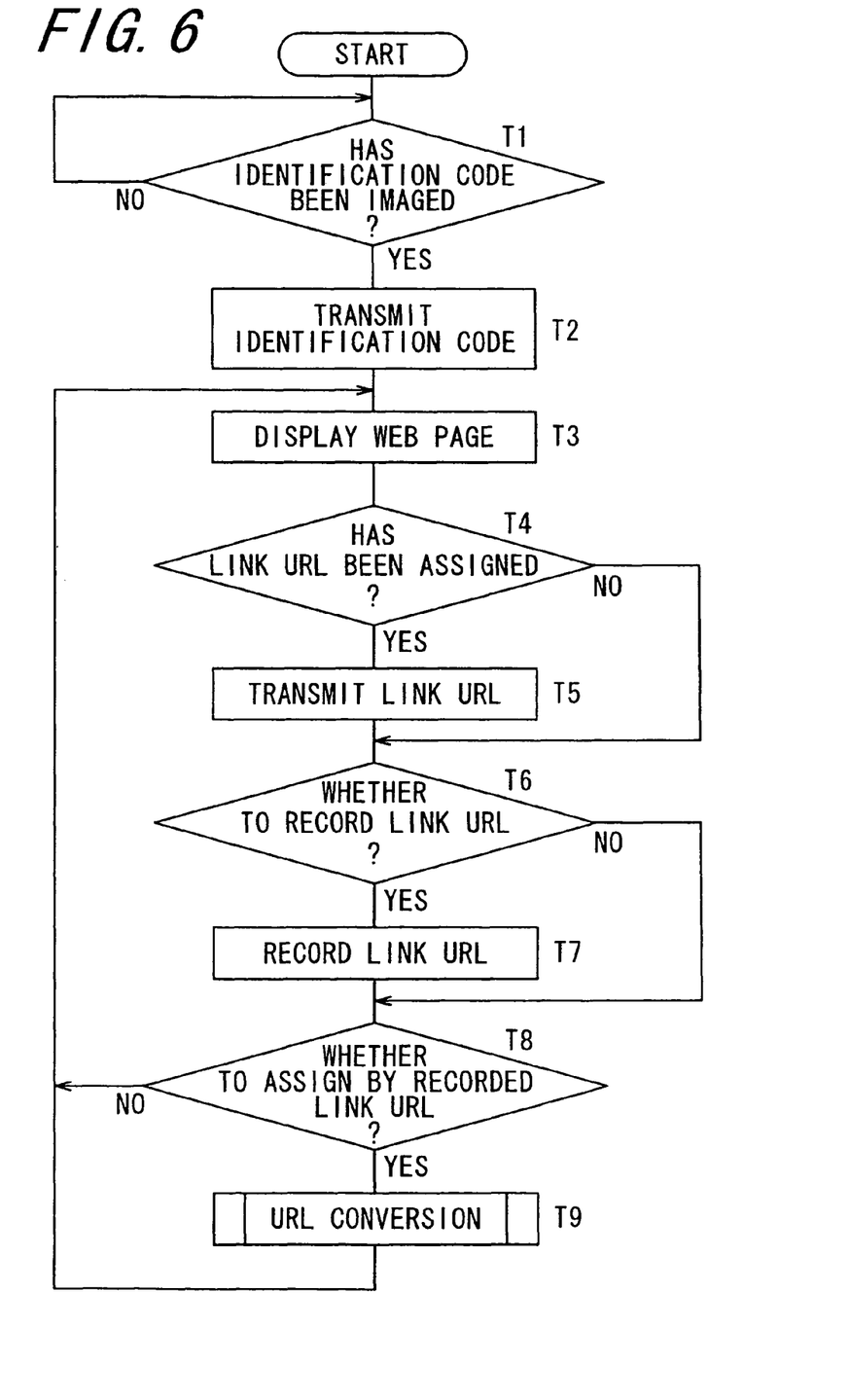
FIG. 6 is a flowchart of a process which is executed by the operation apparatus of FIG. 2.

FIG. 6 is a flowchart of a process which is executed by the operation apparatus of FIG. 2. This flowchart is executed by the control portion 23 of the operation apparatus 20. When the power supply of the electronic apparatus 10 is provided to enter the operable state, the process proceeds to Step T1.

At Step T1, it is determined whether or not the QR code 2 or the identification code that has been displayed on the identification code display portion 11 of the electronic apparatus 10 has been imaged by the identification code input portion 21, for example the camera 21a. When the identification code has been imaged, the process proceeds to Step T2, and when the identification code has not been imaged, the process returns to Step T1. At Step T2, the identification code that is obtained by decoding the QR code 2 that has been imaged at Step T1 is transmitted as the URL. By transmitting the URL, access to the WEB server function of the electronic apparatus 10 is achieved. At Step T3, a WEB screen page that has been received from the WEB server function of the electronic apparatus 10 is displayed on the display portion 26.

At Step T4, whether the link URL has been assigned or not is determined. That is, it is determined whether the operation for the electronic apparatus 10 has been assigned from the WEB page screen of FIG. 3 or not. When the operation for the electronic apparatus 10 has been assigned, the link URL corresponding to the operation that has been assigned is generated. When the link URL has been assigned, the process proceeds to Step T5, and when the link URL has not been assigned, the process proceeds to Step T6. At Step T5, the link URL that has been assigned at Step T4 is transmitted. For example, when the operation that has been assigned from the WEB screen page of FIG. 3 suggests sending an e-mail, the link URL of FIG. 4B is transmitted.

At Step T6, it is determined whether or not a user's assignment through the operation portion 25 is an assignment for recording the link URL that has been transmitted. When the recording of the link URL that has been transmitted is assigned, the process proceeds to Step T7, and when the recording of the link URL is not assigned, the process proceeds to Step T8. At Step T7, the link URL that has been transmitted is recorded, that is, stored in the storage portion 24.

At Step T8, it is determined whether an assignment by the recorded link URL is performed or not. That is, it is determined whether a user's assignment through the operation portion 25 is an assignment using the link URL recorded in the storage portion 24 or not. When the assignment is performed by the recorded link URL, the process proceeds to Step T9, and when the assignment is not performed by the recorded link URL, the process returns to Step T3. At Step T3, the WEB screen page that has been transmitted from the electronic apparatus 10 according to the link URL that has been transmitted at Step T5 or Step T9 is displayed on the display portion. At Step 9, the link URL to which the recorded link URL is applied is generated and transmitted, and the process returns to Step T3.

Figure 7:
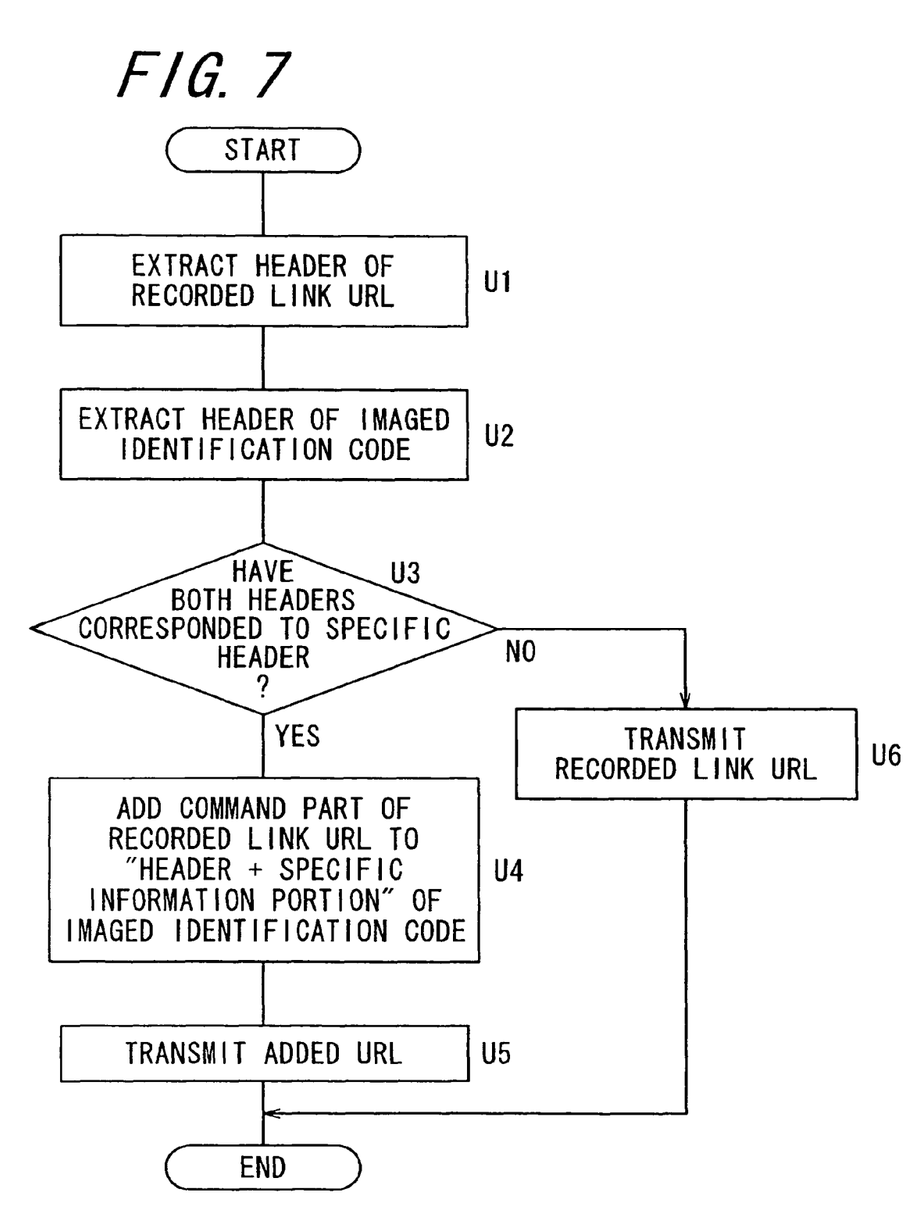
FIG. 7 is a flowchart of a URL conversion called by the flowchart of FIG. 6.

FIG. 7 is a flowchart of a URL conversion called by the flowchart of FIG. 6. This flowchart shows the detailed process of Step 9 of FIG. 6, and is executed by the control portion 23 of the operation apparatus 20. When the assignment is performed by the recorded link URL at step T8 of FIG. 6, the process proceeds to Step U1.

At Step U1, the header included in the link URL that has been selected by the operation portion 25 is extracted from the link URLs stored in the storage portion 24. At Step U2, the header is extracted from the identification code to which the QR code that has been imaged at Step T1 of FIG. 6 has been decoded. At Step U3, it is determined whether or not the header that has been extracted at Step U1 and the header that has been extracted at Step U2 correspond to a specific header, for example the header indicating a manufacturer of a specific electronic apparatus. When the header that has been extracted corresponds to the specific header, the process proceeds to Step U4, and when the header that has been extracted does not correspond to the specific header, the process proceeds to Step U6.

At Step U4, the operation information or the command part included in the link URL that has been selected from the link URLs stored in the storage portion 24, is added to the identification code to which the QR code that has been imaged at Step T1 of FIG. 6 has been decoded. At Step U5, the link URL having the command part added thereto is transmitted, and the process is finished. At Step U6, the link URL that has been selected by the operation portion 25 out of the link URLs that have been stored in the storage portion 24 at Step U1 is transmitted, and the process is finished.

As described above, the electronic apparatus 10 generates the identification code as the identification information for identifying the differences between the electronic apparatus 10 and a user adjacent to the electronic apparatus 10, and transmits the identification code to the identification code display portion 11 as the output portion. And the operation portion 20 inputs the identification information that has been outputted from the output portion by the identification code input portion 21 as the input portion, and transmits the identification information that has been inputted and the operation information for operating the electronic apparatus. The cellular phone base station apparatus 30 included in the transfer portion then transfers the identification information and the operation information each that has been transmitted from the operation apparatus 20, to the electronic apparatus 10 identified by the identification information. Subsequently, the electronic apparatus 10 executes the process according to the operation indicated by the operation information that has been received by the electronic apparatus 10.

As described above, when a user adjacent to the electronic apparatus inputs the identification information that has been generated and outputted in the electronic apparatus 10 into the operation apparatus 20, and the operation apparatus 20 adds the operation information to the identification information and transmits the identification information having the operation information, and the transfer portion such as a cellular phone base station apparatus 30 transfers the identification information having the operation information to the electronic apparatus 10 identified by the identification information, the electronic apparatus 10 executes the process according to the operation indicated by the operation information that has been transferred. This eliminates the need for previously registering the identification code or the like for identifying a user, and allows only a user adjacent to the electronic apparatus 10 to readily operate the electronic apparatus 10 from the operation apparatus 20 such as a portable terminal without using a short-distance radio transmission data communication apparatus employing a radio communication technique such as Bluetooth. Therefore, this allows only a user adjacent to the electronic apparatus 10 to readily operate the electronic apparatus 10 with the user's favorite portable apparatus, reduces the possibility that another person sees the operation screen, and enables the operation without touching a common operation panel.

Moreover, when the identification information that has been received corresponds to the identification information that has been displayed on the identification code display portion 11 as the output portion, the electronic apparatus 10 executes the process according to the operation indicated by the operation information that has been received. This allows a user to operate the electronic apparatus 10 only from the operation apparatus 20 to which the user has been able to input the identification information that has been outputted through the output portion. Therefore, only a user adjacent to the electronic apparatus 10 can operate the electronic apparatus 10.

In addition, when the user validation portion 12 of the electronic apparatus 10 validates that a user is present in the predetermined area centered on the electronic apparatus 10, the electronic apparatus 10 generates the identification code as the identification information and the identification code is displayed on the identification code display portion 11 as the output portion, so that the electric apparatus 10 can generate the identification information, when validating that a user is present in the predetermined area centered on the electronic apparatus 10. Therefore, a user who can operate the electronic apparatus 10 can be limited to a user who is present in the predetermined area cantered on the electronic apparatus 10.

Moreover, after the process according to the operation indicated by the operation information is finished or when the user validation portion 12 does not validate that a user is present in the predetermined area centered on the electronic apparatus 10, the identification information that has been outputted by the identification code display portion 11 is erased. Furthermore, when the user validation portion 12 newly validates that a user is present in the predetermined area centered on the electronic apparatus 10, the new identification information is newly generated, which is outputted to the output portion. Therefore, the new identification information can be generated with respect to each processing unit or user. This can prevent another user from operating the electronic apparatus 10 using the identification information that was previously used.

Moreover, the identification code display portion 11 as the output portion of the electronic apparatus 10 is a display panel, and the identification code input portion 21 as the input portion of the operation apparatus 20 is the imaging portion such as a camera, so that the electronic apparatus 10 can be operated from the operation apparatus 20 having the imaging portion. Therefore, the electronic apparatus 10 can be operated by the portable terminal such as a cellular phone having a camera.

Moreover, the operation portion 20 transmits the operation information that has been extracted by the control portion 23 as the extracting portion and the identification information that has been inputted by the identification data input portion 21 as the input portion, from the storage portion 24 that stores the identification information and the operation information each that has been transmitted by the communication portion 22 as the transmission portion, so that the operation apparatus 20 can transmit the operation information of the operation that was previously executed, in corporation with the identification information that has been outputted from the electronic apparatus 10 adjacent to a user. Therefore, the user can execute the operation, which the user previously executed for the electronic apparatus including other electronic apparatuses, for the electronic apparatus 10 adjacent to the user, and the user can utilize the operation information previously stored like a book mark, that is, the command for the electronic apparatus, also for other electronic apparatuses.

In addition, the electronic apparatus 10 includes the WEB server function, and the operation apparatus 20 includes the WEB browser function, and the WEB browser function assigns the URL included in the identification information to access the WEB server function. Therefore, the operation for the electronic apparatus 10 can be executed from the screen of the WEB browser displayed on the operation apparatus 20, so that the operation of the electronic apparatus 10 can be executed from the consistent screen of the WEB browser, allowing the operation to have common operation specifications, even though the operation specification varies depending upon the size of display panels of the common manufacturer's apparatuses.

In the embodiment as described above, the operation apparatus 20 stores the link URL that has been transmitted from the communication portion 22 in the storage portion 24. However, the operation information that has been inputted from the operation portion 25 may be stored in the storage portion 24. That is, the operation information indicating the operation for the electronic apparatus 10 is previously stored in the storage portion 24 to allow the operation for the electronic apparatus 10 to be selected from the operation information stored in the storage portion 24.

As described above, the operation information can be selected from the operation information that has been inputted by the operation portion 25 and stored in the storage portion 24 to utilize the operation information previously registered, allowing the operation for inputting the operation information to be simplified. For example, the operation for inputting the operation information includes only one action for selecting the operation from the list of the operation information stored in the storage portion 24, and requires no need for sequentially operating to achieve a screen for selecting the operation from the main menu of the operation apparatus 20. In addition, a user simply selects the operation from the operation information stored in the storage portion 24, even though the electronic apparatus 10 is a different apparatus. Moreover, the operation for inputting a final destination address of the screen can be simplified by including a mail address stored in the operation apparatus 20 such as a portable terminal into the operation information for operating to send an e-mail.

Moreover, in the embodiment as described above, the liquid crystal touch panel is employed as the identification code display portion 11 of the output portion, and the imaging portion such as a camera is employed as the identification code input portion 21 of the input portion. However, the output portion may include, but not limited to, a printing device such as a printer, and the input portion may include, but not limited to, an operation panel having a numeric key and an alphabetic key. The output portion may be anything capable of outputting information and the input portion may be anything capable of inputting the information that has been outputted by the output portion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus operating system comprising:
    an electronic apparatus including a generating portion for generating identification information which identifies the electronic apparatus and an output portion for outputting the identification information that has been generated by the generating portion;
    an operation apparatus including an input portion for inputting the identification information that has been outputted by the output portion of the electronic apparatus, an operation portion for inputting operation information for operating the electronic apparatus, and a transmission portion for transmitting the identification information that has been inputted by the input portion and the operation information that has been inputted by the operation portion; and
    a transfer portion for transferring the identification information and operation information that has been transmitted by the transmission portion of the operation apparatus to the electronic apparatus identified by the identification information;
    wherein the electronic apparatus further comprises a reception portion for receiving the identification information and operation information transmitted from the transfer portion, and executes the process according to the operation indicated by the operation information that has been received by the reception portion.

2. The electronic apparatus operating system of claim 1, wherein when the identification information that has been received by the reception portion corresponds to the identification information that has been generated by the generating portion, the electronic apparatus executes the process according to the operation indicated by the operation information that has been received by the reception portion.

3. The electronic apparatus operating system of claim 1, wherein the electronic apparatus further comprises:
    a user validation portion for validating that a user is present adjacent to the electronic apparatus in the predetermined area centered on the electronic apparatus; and
    a control portion for causing the generating portion to generate the identification information and then causing the output portion to output the identification information that has been generated by the generating portion, when the user validation portion validates that a user is present in the predetermined area centered on the electronic apparatus.

4. The electronic apparatus operating system of claim 3, wherein after the process according to the operation indicated by the operation information that has been received from the transfer portion is finished, or when the user validation portion does not validate that a user is present in the predetermined area centered on the electronic apparatus, the control portion causes the identification information that has been outputted through the output portion to be erased, and when the user validation portion newly validates that a user is present in the predetermined area centered on the electronic apparatus, the control portion causes identification information to be newly generated and causes the output portion to output the identification information that has been newly generated.

5. The electronic apparatus operating system of claim 1, wherein the output portion of the electronic apparatus is a display panel, and
    the input portion of the operation apparatus is an imaging portion that images the identification code that has been displayed on the display panel.

6. The electronic apparatus operating system of claim 1, wherein the operation apparatus further includes a storage portion for storing the operation information that has been inputted by the operation portion, and the transmission portion transmits the operation information that has been selected by the operation portion out of the identification information that has been inputted by the input portion and the operation information that has been stored in the storage portion.

7. The electronic apparatus operating system of claim 1, wherein the operation apparatus further includes a storage portion for storing the identification information and the operation information each that has been transmitted by the transmission portion, and an extracting portion for extracting the operation information from the identification information and the operation information each that has been stored in the storage portion, and
    the transmission portion transmits the operation information that has been selected by the operation portion and the identification information that has been inputted by the input portion out of the operation information that has been extracted by the extracting portion.

8. The electronic apparatus operating system of claim 1, wherein the electronic apparatus further includes a WEB server function,
    the operation apparatus further includes a WEB browser function,
    the identification information includes a URL (Uniform Resource Locator) of the WEB server function of the electronic apparatus, and
    the WEB browser function accesses the WEB server function by assigning the URL.

* * * * *